United States Patent
Kim et al.

(10) Patent No.: US 8,645,307 B2
(45) Date of Patent: Feb. 4, 2014

(54) APPARATUS AND METHOD FOR GENERATING PROBABILISTIC GRAPHICAL MODEL BASED ON TIME-SPACE STRUCTURE

(75) Inventors: Yeo-Jin Kim, Hwaseong-si (KR); Byoung-Tak Zhang, Seoul (KR); Byung-Chull Bae, Anyang-si (KR); Hyun-Jin Choi, Seoul (KR); Yun-Gyung Cheong, Anyang-si (KR); Young-Sang Choi, Seongnam-si (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 308 days.

(21) Appl. No.: 13/112,420

(22) Filed: May 20, 2011

(65) Prior Publication Data

US 2012/0041920 A1  Feb. 16, 2012

(30) Foreign Application Priority Data

Aug. 12, 2010 (KR) .......................... 10-2010-0078012

(51) Int. Cl.
 *G06N 5/00* (2006.01)
(52) U.S. Cl.
 USPC .............................................. 706/52; 706/45
(58) Field of Classification Search
 USPC ..................................................... 706/52, 45
 See application file for complete search history.

(56) References Cited

U.S. PATENT DOCUMENTS

| 7,296,005 | B2 | 11/2007 | Minamino et al. |
| 7,698,055 | B2 | 4/2010 | Horvitz et al. |
| 2010/0070456 | A1 | 3/2010 | Sugihara et al. |

FOREIGN PATENT DOCUMENTS

| JP | 2006-113683 | 4/2006 |
| JP | 2006-162898 | 6/2006 |
| JP | 2010-072811 | 4/2010 |
| KR | 10-2002-0015838 | 3/2002 |
| KR | 10-2006-0092909 | 8/2006 |
| KR | 10-2007-0113558 | 11/2007 |
| KR | 10-0961992 | 9/2009 |
| KR | 10-2010-0000265 | 1/2010 |
| KR | 10-0961992 | 6/2010 |

OTHER PUBLICATIONS

Barber, Bayesian Reasoning and Machine Learning, Cambridge University Press, 2010, pp. 1-610.*

* cited by examiner

*Primary Examiner* — Wilbert L Starks
(74) *Attorney, Agent, or Firm* — NSIP Law

(57) ABSTRACT

An apparatus for generating a probabilistic graphical model based on a time-space structure. The apparatus includes a first matrix generation unit configured to generate a first matrix having variables corresponding to stream data; a second matrix generation unit configured to classify the variables of the first matrix into either object variables that are objects of interest or input variables, acquire combination variables from multi-order combination of the input variables, and generate a second matrix using the acquired combination variables; and a model creation unit configured to create the probabilistic graphical model using the object variables of the first matrix and the combination variables of the second matrix.

21 Claims, 6 Drawing Sheets

APPARATUS AND METHOD FOR GENERATING PROBABILISTIC GRAPHICAL MODEL BASED ON TIME-SPACE STRUCTURE

CROSS-REFERENCE TO RELATED APPLICATION(S)

This application claims the benefit under 35 U.S.C. §119 (a) of Korean Patent Application No. 10-2010-0078012, filed on Aug. 12, 2010, in the Korean Intellectual Property Office, the entire disclosure of which is incorporated herein by reference for all purposes.

BACKGROUND

1. Field

The following description relates to generation of a probabilistic graphical model.

2. Description of the Related Art

Various devices that are commonly referred to as smart devices provide a variety of functions and services to a user. Recently, with the explosion of different types of services offered by a smart device, a users' desire to be provided only with services which are currently needed by the user is increasing.

In the real world, context information is very uncertain, and it is therefore difficult to discern exactly which of the services available for a smart device may be currently desired by the user. Thus, a service optimal to a current situation of a user is generally determined in a statistical manner. The statistic determination may be carried out based on a probabilistic graphical model generated by modeling context information and a service suitable to the context information.

A probabilistic graphical model may be designed manually by a user, or automatically by machine generation. One possible problem with the manual design performed by the user may be that an automatic update is not possible once the model has been fixed. Conversely, the automatic design may enable the probabilistic graphical model to be automatically updated by a machine generation algorithm, but such automatic design is limited regarding an ability to cover as large an amount of uncertain context information of the real world.

In addition, real world data may be in the form of stream data. Since the stream data varies with time even though the real-time output of the stream data should be, by its nature, ensured, it is not appropriate to apply a typical probabilistic graphical model to such stream data.

SUMMARY

In one general aspect, there is provided an apparatus for generating a probabilistic graphical model based on a time-space structure, the apparatus including a first matrix generation unit configured to generate a first matrix including variables corresponding to stream data, a second matrix generation unit configured to classify the variables of the first matrix into either object variables that are objects of interest or input variables, acquire combination variables through multi-order combination of the input variables, and generate a second matrix using the acquired combination variables, and a model creation unit configured to create the probabilistic graphical model using the object variables of the first matrix and the combination variables of the second matrix.

The first matrix generation unit may be further configured to arrange the variables in a two-dimensional structure including rows and columns, each of the rows corresponding to a type of the stream data and each of the columns corresponding to an input time of the stream data.

The second matrix generation unit may be further configured to include a classification unit configured to classify the variables of the first matrix into either the object variables or the input variables, an input variable selection unit configured to select a plurality of variables from the input variables on the rows and the columns, a combination variable acquisition unit configured to acquire first-order to $n^{th}$-order combination variables by combining the selected input variables n number of times, and a matrix expansion unit configured to generate the second matrix including the acquired combination variables.

The input variable selection unit may be further configured to select an arbitrary number of input variables from one or more of the rows.

The input variable selection unit may be further configured to select n input variables from one or more of the rows, and n may be determined based on a Markov chain order.

The model creation unit may be further configured to include a node determination unit configured to determine relationships between nodes of the probabilistic graphical model based on conditional probability tables of the object variables of the first matrix and the combination variables of the second matrix, and a structure determination unit configured to determine a structure of the probabilistic graphical model by removing an entry of a conditional probability table having a probability value equal to or smaller than a predefined threshold.

The apparatus may further include a model update unit configured to store the created probabilistic graphical model or update a previously stored probabilistic graphical model using the created probabilistic graphical model.

The apparatus may further include an inference unit configured to infer an object variable optimal to a current situation using the created probabilistic graphical model.

In another general aspect, there is provided a method of generating a probabilistic graphical model based on a time-space structure, the method including generating a first matrix including variables corresponding to stream data, classifying the variables of the first matrix into either object variables that are objects of interest or input variables, acquiring combination variables through multi-order combination of the input variables, and generating a second matrix using the acquired combination variables, and creating the probabilistic graphical model using the object variables of the first matrix and the combination variables of the second matrix.

The generating of the first matrix may include arranging the variables in a two-dimensional structure including rows and columns, each of the rows corresponding to a type of the stream data and each of the columns corresponding to an input time of the stream data.

The generating of the second matrix may include classifying the variables of the first matrix into either the object variables or the input variables, selecting a plurality of variables from the input variables on the rows and the columns, acquiring first-order to $n^{th}$-order combination variables by combining the selected input variables n number of times, and generating the second matrix including the acquired combination values.

The selecting of the plurality of input values may include selecting an arbitrary number of input variables from one or more of the rows.

The selecting of the plurality of input values may include selecting n input variables from one or more of the rows, and n may be determined based on a Markov chain order.

The creating of the model may include determining relationships between nodes of the probabilistic graphical model based on conditional probability tables of the object variables of the first matrix and the combination variables of the second matrix, and determining a structure of the probabilistic graphical model by removing an entry of a conditional probability table having a probability value equal to or smaller than a predefined threshold.

The method may further include storing the created probabilistic graphical model or updating a previously stored probabilistic graphical model using the created probabilistic graphical model.

The method may further include inferring an object variable optimal to a current situation using the created probabilistic graphical model.

In another general aspect, there is provided a method of generating a probabilistic graphical model, the method including forming a first matrix in which input and object variables corresponding to stream data are recorded in rows according to type, expanding the first matrix into a second matrix by forming combination variables of selected input variables of the first matrix, and generating the probabilistic graphical model using the object variables of the first matrix and the combination variables of the second matrix.

The combination variables may be formed through multi-order combination of the selected input variables of the first matrix.

The multi-order combination is based on a Markov chain order.

Other features and aspects may be apparent from the following detailed description, the drawings, and the claims.

Figure 1:
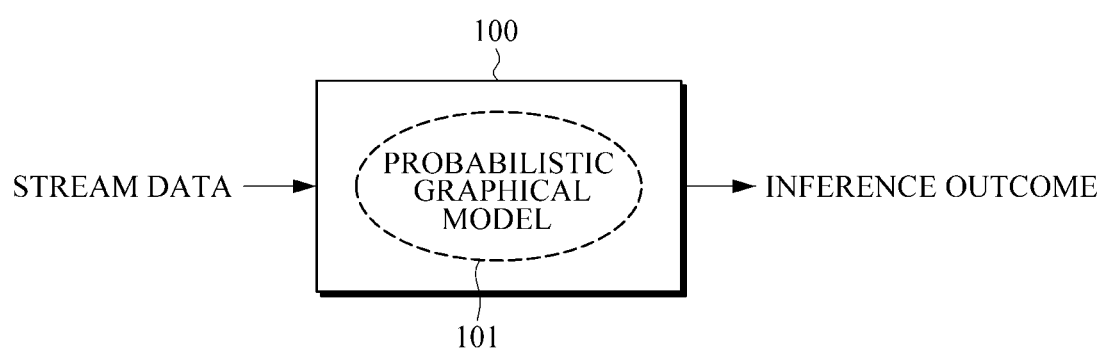
FIG. 1 illustrates an example of an overall configuration of an apparatus for generating a probabilistic graphical model.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an overall configuration of an apparatus for generating a probabilistic graphical model. Referring to the example illustrated in FIG. 1, the apparatus 100 may use a probabilistic graphical model 101 to generate a resonating result suitable to received stream data. For example, in a case in which the apparatus 100 is applied or provided to a smart device such as a smart phone which may run a variety of applications, the stream data may include various types of context information (for example, time, location, temperature, scheduler, email, or the like) related to the smart phone, and an inference outcome may refer to an application which is inferred using the probabilistic graphical model and is optimal to the current situation regarding the user and the smart phone. It is understood that the smart phone discussed in this and/or other examples is merely one possible example of a smart device to which the apparatus 100 may be applicable.

In addition, the apparatus 100 may be applied to an intelligent user interface (IUI) for smart phone users. IUI may recognize the past and present situation of the user to predict services and applications optimal to the present situation, and may thereby offer the predicted services or applications to the user. To allow the user to directly access a desired application among numerous available applications, the IUI may provide icons of the predicted applications on a front page. However, such direct access as provided by presenting the icons on a front page is merely one example of offering the predicted services or applications to the user, and it is understood that such icons, text based menu items, and the like may be presented in any number of various configurations, such as on additional pages which may be selected by hard and/or soft buttons, etc., to a user of the smart device.

Also, the above description is merely an example provided for convenience of explanation, and the apparatus 100 may be further applicable to a variety of fields which require a specific inference outcome according to time-space pattern changes of various variables, and which may include, for example, a bio system to discover new knowledge by clarifying a gene expression mechanism, a healthcare system to suggest an appropriate remedy based on a behavior pattern of a patient, an educational system to provide an optimal educational method to a user based on a behavior pattern of a user, and so on.

The stream data may change with time, and the types of data that are streamed may vary widely. In other words, the stream data may be represented by multivariate time-series data, and in the example illustrated in FIG. 1, the apparatus 100 may create and/or update the probabilistic graphical model 101 that processes multivariate time-series data in an uncertain environment and deduce an optimal inference outcome.

Figure 2:
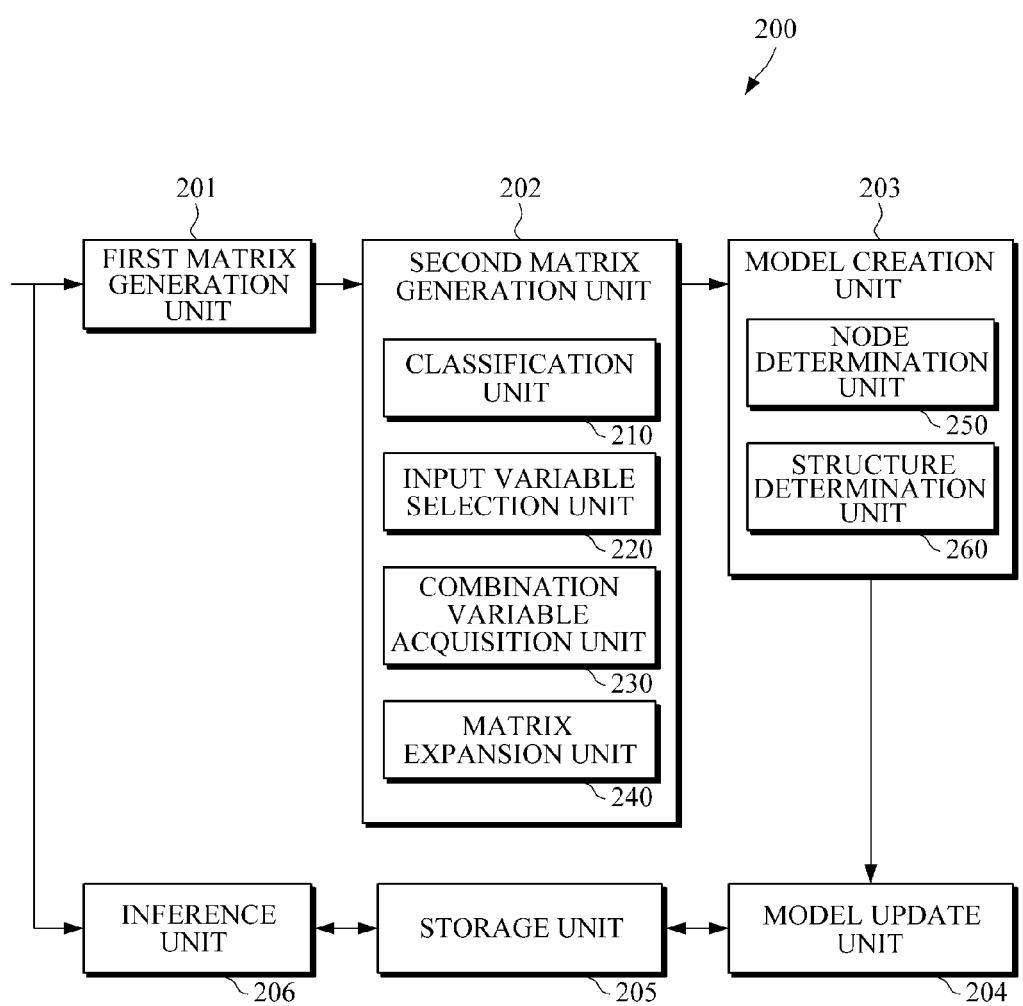
FIG. 2 illustrates an example of a more detailed configuration of the apparatus for leaning a probabilistic graphical model.

FIG. 2 illustrates an example of a detailed configuration of the apparatus for generating a probabilistic graphical model. Referring to the example illustrated in FIG. 2, the apparatus 200 may include a first matrix generation unit 201, a second matrix generation unit 202, a model creation unit 203, a model update unit 204, a storage unit 205, and an inference unit 206. According to various example configurations of the apparatus 200, two or more of the units illustrated in FIG. 2 may be provided as combined components.

The first matrix generation unit 201 may generate a first matrix. The first matrix includes multiple variables, each of which corresponds to different available stream data. The stream data is data that is to be obtained as time passes, and it may be understood that the respective variable which is assigned with the stream data has a time property and a space property. The time property of the respective variable may indicate when the stream data was input or measured, and the space property may indicate the type of the stream data to which the variable corresponds. For example, the first matrix generation unit 201 may form a first matrix by arranging variables in a second-order structure including one or more rows, each corresponding to a type of stream data, and one or more columns, each corresponding to an input time of stream data. Conversely, the one or more columns may correspond to the type of the respective stream data, and the one or more rows may correspond to the input time of the respective stream data.

The second matrix generation unit 202 may form a second matrix that is expanded from the first matrix by combining the variables of the first matrix. The second matrix generation unit 202, as illustrated in the example of FIG. 2, may include a classification unit 210, an input variable selection unit 220, a combination variable acquisition unit 230, and a matrix expansion unit 240.

The classification unit 210 may classify all variables into object variables and input variables. Each of the object variables is a variable representing an object of interest, and corresponds to an interference outcome through a probabilistic graphical model. The input variables are variables that are not object variables, and correspond to input data for the probabilistic graphical model. For example, in a case in which it is assumed that the first matrix includes a periodically measured location of a smart phone, a temperature at the time of location measurement, and an identifier of an application at the time of location measurement, the identifier of the application may be classified as an object variable and the location and the temperature may be classified as input variables.

The classification of variables of the first matrix may vary according to the purposes of use and applications. If, as in the example previously described, the identifier of the application is classified as an object variable, and the location and the temperature are classified as input variables, an application optimal to the current location and temperature may be inferred based on the probabilistic graphical model.

The input variable selection unit 220 may select input variables to be use to generate the second matrix from the input variables according to the rows and columns of the first matrix. For example, the input variable selection unit 220 may select input variables from among both the rows and columns of the first matrix. In such an example, selection from among both the rows and columns may include various input variables being selected or not selected on one or more fixed rows and/or one or more fixed columns. In other words, according to various examples, variables corresponding to only certain columns of a row may be selected, and/or variables corresponding to only certain rows of a column may be selected, so that the entirety of the variables of the first matrix may not be included in the generation of the second matrix.

For example, the input variable selection unit 220 may select a predefined number of input variables on each row. In other words, from a first row which may correspond to first stream data collected at regular time intervals, input variables of three columns may be selected, and from a second row which may correspond to second stream data collected at regular time intervals, input variables of four columns may be selected.

For another example, the input variable selection unit 220 may select n input variables on each row. In other words, in an example in which n=3, from the first row corresponding to the first stream data collected at regular time intervals, input variables of three columns may be selected, and from the second row corresponding to the second stream data collected at regular time intervals, input variable of three columns may be selected.

In addition, input variables selected from the input variables of the first matrix by the input variable selection unit 220 may vary according to the purposes of use and applications.

The combination variable acquisition unit 230 may generate a multi-order combination of the input variables selected by the input selection unit 220 as a combination variable which is an element of the second matrix. In this case, a first-order combination refers to a combination of one input variable among the selected input variables, and a second-order combination refers to a combination of two input variables selected from the selected input variables. As such, the multi-order combination refers to a generation of a new variable group by increasing a dimension of the combination. For example, if the combination variable acquisition unit 230 generates combination variables through the second-order combination, first-order combination variables may be generated from one input variable selected from the input variables selected by the input variable selection unit 220, and then second-order combination variables may be generated from two input variables selected from the input variables selected by the input variable selection unit 220. At this time, an order of combination may be determined based on a Markov chain order, and have a value equal to or more than 1.

The matrix expansion unit 240 may generate the second matrix using the combination variables generated by the combination variable acquisition unit 230. As a result, the second matrix may be an expanded version of the first matrix. That is, the second matrix may be a matrix of variables expanded from the input variables of the first matrix by combining possible relationships between the various input variables.

The model creation unit 203 may create the probabilistic graphical model using the object variable of the first matrix and the combination variables of the second matrix. With regard to the probabilistic graphical model, the combination variables of the second matrix may correspond to input data of the probabilistic graphical model, and the object variable of the first matrix may correspond to an inference outcome of the probabilistic graphical model. The model creation unit 203, as illustrated, may include a node determination unit 250 and a structure determination unit 260.

The node determination unit 250 may determine a relationship between the object variable of the first matrix and the combination variables of the second matrix. The relationship between the variables may be represented as a conditional probability table, and the node determination unit 250 may generate a conditional probability table to indicate the probability of each variable.

The structure determination unit 260 may determine the overall structure of the probabilistic graphical model. For example, the structure determination unit 260 may remove a portion from each conditional probability table, if the subject portions have probabilities that are smaller than a predefined threshold, and thereby determine a link structure between the variables.

In addition, a maximum likelihood estimation or Bayesian estimation algorithm may be used to generate the conditional probability tables and remove links.

The model update unit 204 may store the created probabilistic graphical model in the storage unit 205. In addition, the model update unit 204 may update a probabilistic graphical model previously stored in the storage unit.

The inference unit 206 may use the probabilistic graphical model stored in the storage unit 205 to generate an inference outcome with respect to the current stream data. For example, the inference unit 206 may receive stream data as context information or situational information, and apply the received stream data to a probabilistic graphical model to infer an object variable optimal to a current context or a current situation.

As such, since the apparatus 200 arranges (obtains time-space information of) a variable in a row of a matrix according to an attribute such as a type of stream data, arranges the variable in a column of the matrix according to an attribute such as the input time of the stream data, and generates a probabilistic graphical model by combining the matrix in a time direction and in a space direction, a structure of pattern inherent in multivariate time-series data may be appropriately recognized, and a probability value of a particular variable may be inferred from data with a complex time-space structure.

Figure 3:
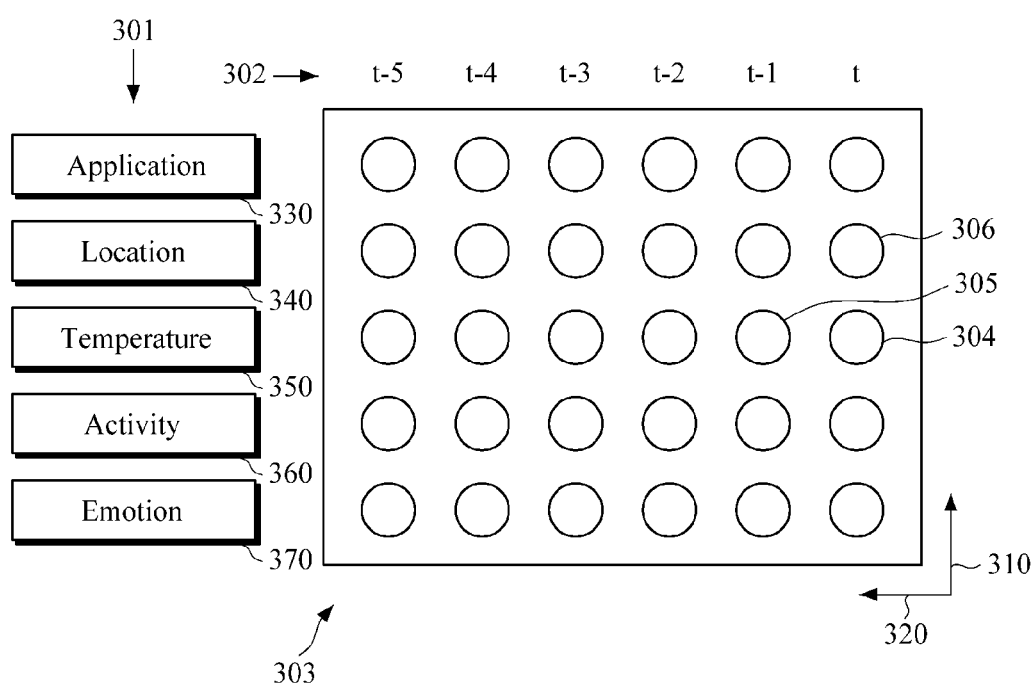
FIG. 3 illustrates an example of a first matrix.

FIG. 3 illustrates an example of a first matrix. Referring to the examples illustrated in FIGS. 2 and 3, the first matrix generation unit 201 may generate a first matrix 303 by mapping stream data 301 to respective corresponding variables sequentially according to input time 302.

The first matrix 303 has two axes. One of the axes of the first matrix 303 corresponds to rows of the matrix 303, and may be referred to as a space axis 310. For example, stream data may be arranged in the first matrix 303 in rows along the space axis 310 according to the type of stream data. The type of stream data may vary according to a type of sensor that collects or detects the stream data, and the stream data may be, for example, application-related stream data 330, location-related stream data 340, temperature-related (or weather-related) stream data 350, activity-related (or action-related) stream data 360, or emotion-related stream data 370. For reference, activity-related stream data 360 may include, for example, sensing information of an acceleration sensor, and the emotion-related stream data 370 may include, for example, facial expression information obtained by a camera.

The other axis of the first matrix 303 corresponds to columns of the matrix, and may be referred to as a time-axis 320. In other words, the space-axis 310 of the first matrix 303 may indicate the type of stream data, and the time-axis may indicate an input time of the corresponding stream data. For example, a variable #1 304 may be temperature data at time t, and a variable #2 305 may be temperature data at time t−1. That is, it may be understood that even stream data of the same type may have a different value according to time, due to the changing nature of the corresponding data over time. In the same manner, at the time t, the variable #1 304 may be temperature data and a variable #3 306 may be location data.

Figure 4:
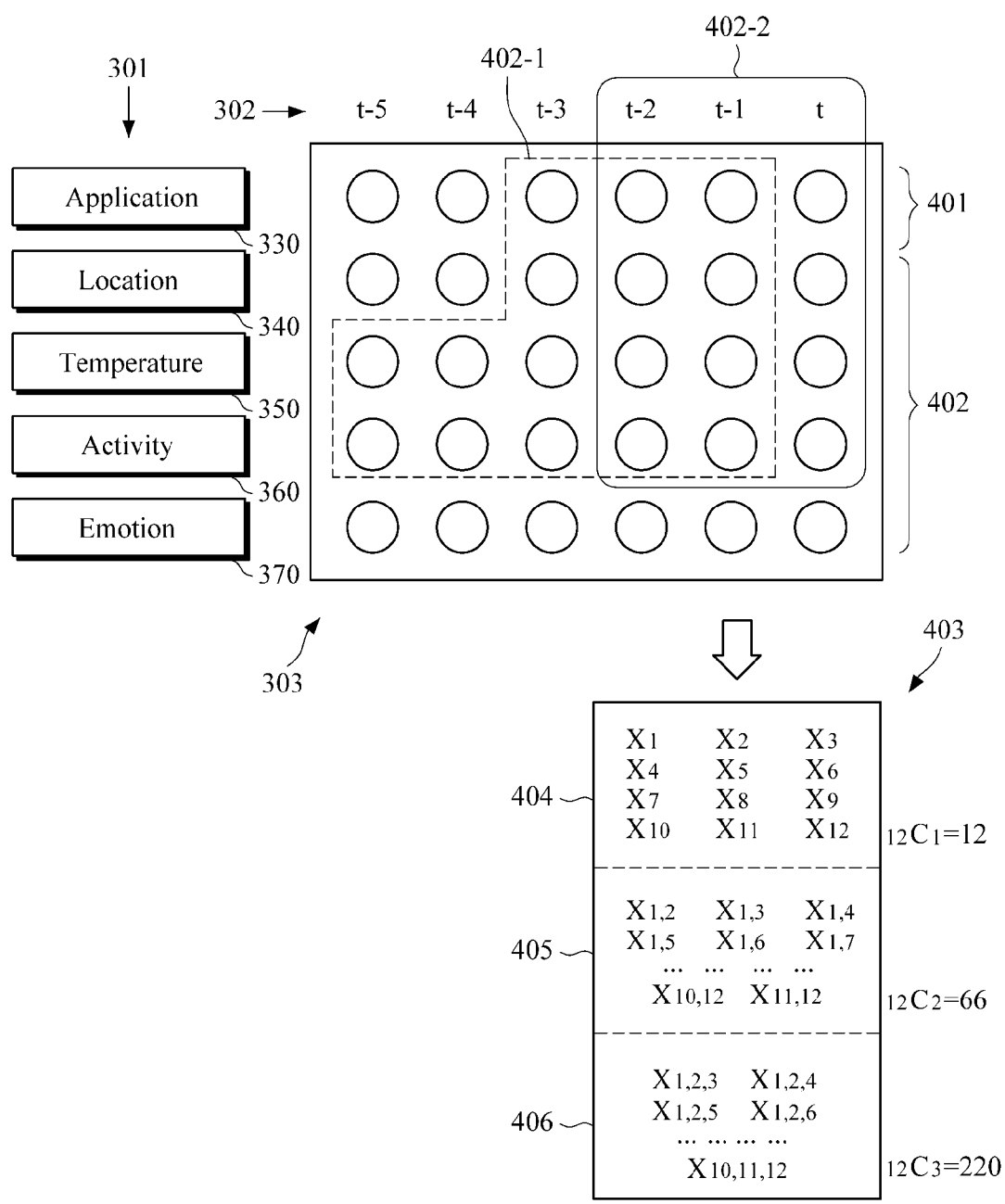
FIG. 4 illustrates an example of a second matrix.

FIG. 4 illustrates an example of a second matrix. Referring to the examples illustrated in FIGS. 2 to 4, the second matrix generation unit 202 may classify variables into first variables 401 and second variables 402. The first variables 401 may be determined based on an object of interests of the user among the total variables. For example, the first variables 401 may be expressed as object variables. The first variables 401 may include variables which are objects of interest of the user, such as application data as in this example, and may correspond to an inference outcome which will be determined from the probabilistic graphical model. The second variables 402 may be determined except the first variables 401 among the total variables. In other words, the remaining variables other than the first variables 401 may be determined as second variables 402. For example, the second variables 402 may be expressed as input variables. The second variables 402 may correspond to context information for generating the inference outcome, or input data to be input to the probabilistic graphical model. The classification criteria may be set in various ways according to the purposes of use and applications. The examples illustrated in FIGS. 2 to 4 are described under an assumption that the type of application-related stream data 330 is assigned as first variable or an object variable 401, and variables corresponding to types and time information of the rest of the stream data including location-related stream data 340, temperature-related stream data 350, activity-related stream data 360, and emotion-related stream data 370 are assigned as second variable or input variables 402.

In response to the first matrix 303 being classified into the object variables 401 and the input variables 402, the second matrix generation unit 202 may select various sets 402-1 or 402-2 from the object variables 401 and input variables 402 of the first matrix 303. Selection criteria may be set in various ways according to the purposes of use and applications, and the examples illustrated in FIGS. 2 to 4 are described under an assumption that variables are selected along the time-axis 320 which is portioned to have the same length as the number of a given Markov chain order.

The Markov chain order indicates the number of parent generations in a case in which a probability of observing a given variable is affected by observation values of parent variables. For example, in a case in which a variable is affected by observation values of parent variables of the $N^{th}$ generation, N is a Markov chain order. As an example, if a Markov chain order is 3, the second matrix generation unit 202 may select variables in the columns of the set 402-2 from t to t−2 in the first matrix 303, and generates second matrix 403 based on multi-combining of the selected variables. However, this is only an example for convenience of explanation, and various numbers and configurations variables in a time-axis direction and a space-axis direction may be selected.

In response to, for example, the input variables 402-1 being selected, the second matrix generation unit 202 may perform multi-order combination of the selected variables 402-1 to generate the second matrix 403. As an example, if a Markov chain order is 3, the second matrix generation unit 202 may generate third-order combination variables. For example, twelve ($_{12}C_1=12$) first-order combination variables 404 may be generated from a combination of one variable selected from the selected input variables 402-1. Sixty-six ($_{12}C_2=66$) second-order combination variables 405 may be generated from a combination of two variables selected from the selected input variables 402-1. In addition, two-hundred and twenty ($_{12}C_3=220$) third-order combination variables may be generated from the combination of three variables selected from the selected input variables 402-1.

Figure 5:
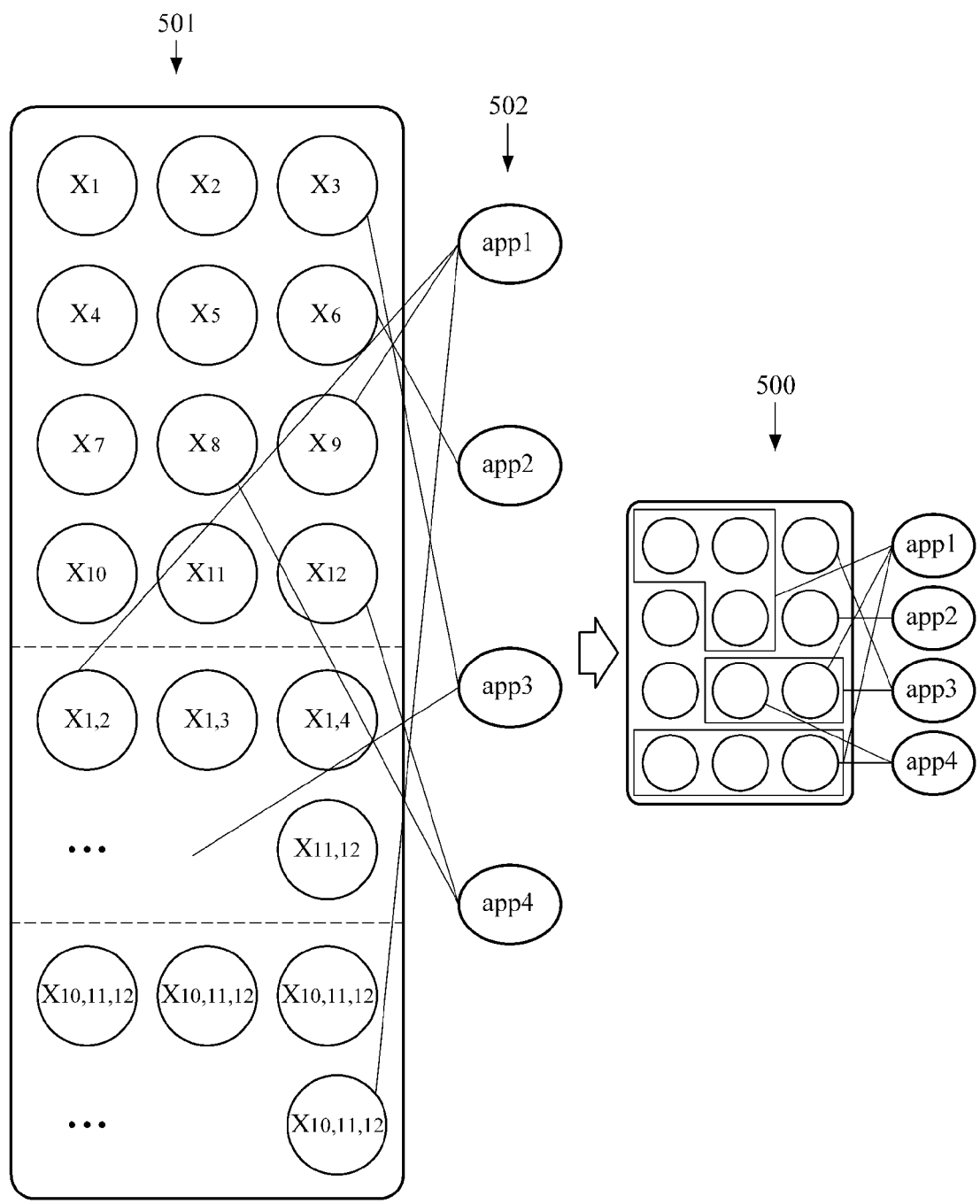
FIG. 5 illustrates an example of a probabilistic graphical model.

FIG. 5 illustrates an example of a probabilistic graphical model. Referring to the examples illustrated in FIGS. 2 to 5, the model creation unit 203 may create a probabilistic graphical model 500 based on the combination variables 501 of the second matrix 403 and object variables 502 of the first matrix 303. For example, the model creation unit 203 may obtain probabilistic graphical models of nodes and determine relationships between the combination variables 501 of the second matrix and the object variables 502 of the first matrix from the obtained probabilistic graphical models, and remove links between less-related nodes to determine a link structure between the combination variables 501 of the second matrix and the object variables 502 of the first matrix. Obtaining of probabilistic graphical models of the respective nodes, obtaining of relationships between nodes, and removing of one or more meaningless links may be performed using a maximum likelihood estimation, Bayesian estimation algorithm, or the like.

Figure 6:
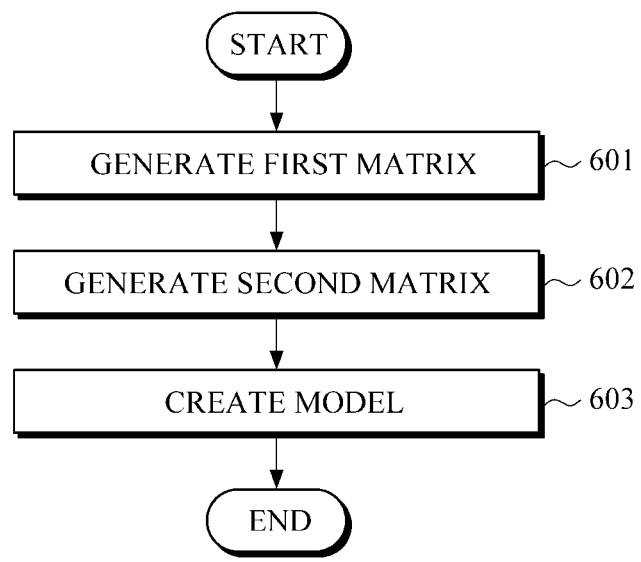
FIG. 6 is a flowchart illustrating an example of a method of generating a probabilistic graphical model.

FIG. 6 is a flowchart illustrating an example of a method of generating a probabilistic graphical model. Referring to the examples illustrated in FIGS. 2 and 6, the first matrix containing variables corresponding to stream data is generated (601). For example, the first matrix generation unit 201 may generate the matrix 303 as illustrated in the example of FIG. 3.

In response to the generation of the first matrix, the second matrix is generated based on the first matrix (602). The second matrix may be an expanded version of the first matrix that is generated by combining selected variables of the first matrix in time-axis and space-axis directions. For example, the second matrix generation unit 202 may expand the first matrix 303 illustrated in FIG. 3 to the matrix 403 illustrated in the example of FIG. 4.

In response to the generation of the second matrix, the probabilistic graphical model is generated (603). For example, the model creation unit 203 may create the probabilistic graphical model using the combination variables 501 of the second matrix 403 and the object variables 502 of the first matrix 303 as illustrated in the example of FIG. 5.

In addition, in one example, the created probabilistic graphical model may be used to deduce a meaningful inference outcome in an uncertain environment. For example, by use of the created probabilistic graphical model, an application or a service optimal to a current situation may be inferred. Moreover, the creation of a probabilistic graphical model may be periodically performed, and a previously created probabilistic graphical model may be updated accordingly.

As described above, the apparatus and method for generating a probabilistic graphical model creates a probabilistic graphical model by taking into consideration time properties and space properties of variables, and thus the created probabilistic graphical model can be appropriately applied to an uncertain situation.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

As a non-exhaustive illustration only, the device described herein, and generally referred to as smart devices, may refer to mobile devices such as, for example, a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and the like.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating a probabilistic graphical model based on a time-space structure, the apparatus comprising:
   a microprocessor;
   a first matrix generation unit configured to generate a first matrix having variables corresponding to stream data;
   a second matrix generation unit configured to classify the variables of the first matrix into either object variables that are objects of interest or input variables, acquire combination variables through multi-order combination of the input variables, and generate a second matrix using the acquired combination variables; and
   a model creation unit configured to create the probabilistic graphical model using the object variables of the first matrix and the combination variables of the second matrix.

2. The apparatus of claim 1, wherein the first matrix generation unit is further configured to arrange the variables in a two-dimensional structure including rows and columns, each of the rows corresponding to a type of the stream data and each of the columns corresponding to an input time of the stream data.

3. The apparatus of claim 2, wherein the second matrix generation unit is further configured to comprise:
   a classification unit configured to classify the variables of the first matrix into either the object variables or the input variables;
   an input variable selection unit configured to select a plurality of variables from the input variables on the rows and the columns;
   a combination variable acquisition unit configured to acquire first-order to $n^{th}$-order combination variables by combining the selected input variables n number of times; and
   a matrix expansion unit configured to generate the second matrix including the acquired combination variables.

4. The apparatus of claim 3, wherein the input variable selection unit is further configured to select an arbitrary number of input variables from one or more of the rows.

5. The apparatus of claim 3, wherein the input variable selection unit is further configured to select n input variables from one or more of the rows.

6. The apparatus of claim 5, wherein n is determined based on a Markov chain order.

7. The apparatus of claim 1, wherein the model creation unit is further configured to comprise:
   a node determination unit configured to determine relationships between nodes of the probabilistic graphical model based on conditional probability tables of the object variables of the first matrix and the combination variables of the second matrix; and a structure determination unit configured to determine a structure of the probabilistic graphical model by removing an entry of a conditional probability table having a probability value equal to or smaller than a predefined threshold.

8. The apparatus of claim 1, further comprising:
a model update unit configured to store the created probabilistic graphical model or update a previously stored probabilistic graphical model using the created probabilistic graphical model.

9. The apparatus of claim 1, further comprising:
an inference unit configured to infer an object variable optimal to a current situation using the created probabilistic graphical model.

10. A method of generating a probabilistic graphical model based on a time-space structure, the method comprising:
generating a first matrix having variables corresponding to stream data;
classifying the variables of the first matrix into either object variables that are objects of interest or input variables, acquiring combination variables through multi-order combination of the input variables, and generating a second matrix using the acquired combination variables; and
creating the probabilistic graphical model using the object variables of the first matrix and the combination variables of the second matrix in an apparatus comprising a microprocessor.

11. The method of claim 10, wherein the generating of the first matrix comprises arranging the variables in a two-dimensional structure including rows and columns, each of the rows corresponding to a type of the stream data and each of the columns corresponding to an input time of the stream data.

12. The method of claim 11, wherein the generating of the second matrix comprises
classifying the variables of the first matrix into either the object variables or the input variables;
selecting a plurality of variables from the input variables on the rows and the columns;
acquiring first-order to $n^{th}$-order combination variables by combining the selected input variables n number of times; and
generating the second matrix including the acquired combination values.

13. The method of claim 12, wherein the selecting of the plurality of input values comprises selecting an arbitrary number of input variables from one or more of the rows.

14. The method of claim 12, wherein the selecting of the plurality of input values comprises selecting n input variables from one or more of the rows.

15. The method of claim 14, wherein n is determined based on a Markov chain order.

16. The method of claim 10, wherein the creating of the model comprises:
determining relationships between nodes of the probabilistic graphical model based on conditional probability tables of the object variables of the first matrix and the combination variables of the second matrix; and
determining a structure of the probabilistic graphical model by removing an entry of a conditional probability table having a probability value equal to or smaller than a predefined threshold.

17. The method of claim 10, further comprising:
storing the created probabilistic graphical model or updating a previously stored probabilistic graphical model using the created probabilistic graphical model.

18. The method of claim 10, further comprising:
inferring an object variable optimal to a current situation using the created probabilistic graphical model.

19. A method of generating a probabilistic graphical model, the method comprising:
forming a first matrix in which input and object variables corresponding to stream data are recorded in rows according to type;
expanding the first matrix into a second matrix by forming combination variables of selected input variables of the first matrix; and
generating the probabilistic graphical model using the object variables of the first matrix and the combination variables of the second matrix in an apparatus comprising a microprocessor.

20. The method of claim 19, wherein the combination variables are formed through multi-order combination of the selected input variables of the first matrix.

21. The method of claim 20, wherein the multi-order combination is based on a Markov chain order.

* * * * *